United States Patent
Green et al.

(12) 
(10) Patent No.: US 10,850,849 B2
(45) Date of Patent: Dec. 1, 2020

(54) VEHICLE ARMREST WITH CUP HOLDER

(71) Applicant: B/E Aerospace, Inc., Wellington, FL (US)

(72) Inventors: John E. Green, Raleigh, NC (US); Thomas C. Crumpler, Winston-Salem, NC (US); Matthew T. Greninger, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 250 days.

(21) Appl. No.: 15/864,432

(22) Filed: Jan. 8, 2018

(65) Prior Publication Data

US 2019/0210732 A1    Jul. 11, 2019

(51) Int. Cl.
| | | |
|---|---|---|
| *B64D 11/06* | (2006.01) | |
| *B60N 3/10* | (2006.01) | |
| *B60N 2/75* | (2018.01) | |
| *A47C 7/62* | (2006.01) | |

(52) U.S. Cl.
CPC .......... *B64D 11/0638* (2014.12); *A47C 7/624* (2018.08); *B60N 2/79* (2018.02); *B60N 3/102* (2013.01); *B64D 11/0644* (2014.12)

(58) Field of Classification Search
CPC . B64D 11/0638; B64D 11/0644; A47C 7/624; B60N 2/79; B60N 3/102
USPC ...................................................... 244/118.5
See application file for complete search history.

(56) References Cited

U.S. PATENT DOCUMENTS

| | | | | |
|---|---|---|---|---|
| 5,104,185 | A | * | 4/1992 | Christiansen .......... B60N 3/106 297/188.16 |
| 5,876,007 | A | * | 3/1999 | Lancaster .............. B60N 3/102 224/281 |
| 5,944,240 | A | * | 8/1999 | Honma ................... B60N 3/102 224/281 |
| 6,264,273 | B1 | | 7/2001 | Waters, Sr. |
| 6,283,551 | B1 | | 9/2001 | Bergin |
| 6,547,326 | B1 | | 4/2003 | Walkinshaw et al. |
| D512,679 | S | * | 12/2005 | Fraser ......................... D12/419 |
| 8,789,867 | B2 | | 7/2014 | Kong |
| 9,592,913 | B2 | | 3/2017 | Bell et al. |
| 10,081,313 | B1 | * | 9/2018 | Ross ...................... B60N 3/102 |
| 2006/0060741 | A1 | * | 3/2006 | Yanagita ................ B60N 3/102 248/311.2 |
| 2006/0237499 | A1 | * | 10/2006 | Teichrieb ............... B60N 3/102 224/281 |
| 2010/0276465 | A1 | * | 11/2010 | Ercolano ................ B60N 3/102 224/281 |
| 2014/0191529 | A1 | * | 7/2014 | Okuhara ................ B60N 3/102 296/37.15 |

* cited by examiner

*Primary Examiner* — Richard R. Green
*Assistant Examiner* — Arfan Y. Sinaki
(74) *Attorney, Agent, or Firm* — Suiter Swantz pc llo

(57) ABSTRACT

An armrest with cup holder for a vehicle seat that includes an elongate armrest can of the armrest adapted to be carried by the seat. An elongate storage area is formed in the armrest can, and the cup holder is mounted for movement along a longitudinal axis of the armrest between a stowed position within the storage area of the armrest can and a deployed position forward of and to the exterior of the armrest. When stowed, the cup holder is positioned fully within the armrest can. The tray table of the seat can therefore be used for purposes other than supporting a beverage container, and can be used when the tray table is stowed.

10 Claims, 21 Drawing Sheets

VEHICLE ARMREST WITH CUP HOLDER

BACKGROUND

The invention disclosed and claimed in this application relates to an armrest, such as the armrest of an aircraft passenger seat, that includes a cup holder installed in the armrest. The cup holder is stowed in the armrest can of the armrest when not in use, and when needed, the seat occupant or flight attendant can manually deploy the cup holder forwardly of the armrest. The cup holder provides a convenient means by which a cup or other similarly-sized container can be positioned near the seat occupant's hand for ready use. In this application the term "cup holder" is used in a broad sense to mean a device that when deployed will hold any suitably sized and shaped article, for example, a milk or juice carton, bottle, electronic device, tissue pack or napkin.

The cup holder enables the typical drop down tray table that deploys from the seat back of a forward positioned seat to be fully utilized for either meal service or as a work surface. This minimizes the possibility of a meal tray, laptop computer or other object resting on the tray table inadvertently knocking a beverage container off of the tray table onto the seat occupant, seat or aircraft deck.

Because the cup holder is totally separate from the tray table, it can be deployed and used even though the tray table is not in use, but is stowed against the seat back of a forward-positioned seat. The cup holder preferably stows fully into the armrest, providing additional room for passage to an aisle, and reducing the possibility of the cup holder being impacted and damaged by a passing seat occupant. The cup holder resides directly under the top cap of the armrest, allowing easy access for installation, maintenance and repair.

SUMMARY

In one aspect, embodiments of the inventive concepts disclosed are directed to a seat armrest that has a cup holder that is stowed in and deploys from the front of the armrest.

In a further aspect, placement of the cup holder in the armrest enables the seat tray table to be used for other purposes.

In a further aspect, placement of the cup holder in the armrest enables the cup holder to be deployed and used when the tray table is not in use, but is stowed.

In a further aspect, placement of the cup holder in the armrest minimizes the possibility of a meal tray, laptop computer or other object resting on the tray table inadvertently knocking a beverage container off of the tray table onto the seat or the aircraft deck.

In a further aspect, the cup holder preferably deploys fully into the armrest, providing additional room for passage to an aisle.

These and other aspects of the invention are achieved by providing an armrest with cup holder for a seat that includes an elongate armrest can adapted to be carried by the seat. An elongate storage area is formed in the armrest can, and the cup holder is mounted for movement along a longitudinal axis of the armrest between a stowed position within the storage area of the armrest can and a deployed position forward of and to the exterior of the armrest.

In accordance with another aspect of the invention, the cup holder includes a stationary arm fixed in orientation to the longitudinal axis of the armrest and a pivot arm mounted for lateral movement relative to the stationary arm to form a space within which a cup is adapted to be held by the stationary arm and the pivot arm.

In accordance with another aspect of the invention, the stationary arm and pivot arm of the cup holder in the deployed position collectively define a width greater than a width of the armrest.

In accordance with another aspect of the invention, the stationary arm and the pivot arm in the deployed position define an arcuate segment.

In accordance with another aspect of the invention, the stationary arm is mounted on a rail positioned in the armrest can and moves relative to the armrest between the stowed position and deployed position.

In accordance with another aspect of the invention, a latch is mounted in the armrest can for retaining the cup holder in the armrest when in the stowed position.

In accordance with another aspect of the invention, the latch includes a push-to-release switch for releasing the cup holder from the stowed position when the push-to-release switch is pushed.

In accordance with another aspect of the invention, the push-to-release switch is actuated by pushing a forward edge of the stationary arm inwardly from a position flush with a forward surface of the armrest.

In accordance with another aspect of the invention, the latch includes a magnet mounted in the armrest can for retaining the cup holder in the stowed position.

In accordance with another aspect of the invention, the pivot arm is mounted on the stationary arm for pivoting movement relative to the stationary arm, and includes a spring connecting the stationary arm and pivot arm for pivoting the pivot arm laterally away from the stationary arm to define the space between the stationary arm and the pivot arm.

In accordance with another aspect of the invention, an armrest with cup holder for a vehicle seat is provided that includes an elongate armrest can adapted to be carried by the seat and an elongate storage area formed in the armrest can. The cup holder is mounted for movement along a longitudinal axis of the armrest between a stowed position within the storage area of the armrest can and a deployed position forward of and to the exterior of the armrest. The cup holder includes a stationary arm fixed in orientation to the longitudinal axis of the armrest and a pivot arm mounted for lateral movement relative to the stationary arm to form a space within which a cup is adapted to be held by the stationary arm and the pivot arm when in the deployed position.

In accordance with another aspect of the invention, the stationary arm and pivot arm of the cup holder in the deployed position collectively define an arcuate segment with a width greater than a width of the armrest.

In accordance with another aspect of the invention, the stationary arm is mounted on a rail positioned in the armrest can, and moves relative to the armrest can between the stowed position and deployed position and includes a latch mounted in the armrest can for retaining the cup holder in the armrest when in the stowed position.

In accordance with another aspect of the invention, the latch includes a push-to-release switch actuated by pushing a forward edge of the stationary arm inwardly from a position flush with a forward surface of the armrest can.

In accordance with another aspect of the invention, an aircraft passenger seat is provided including a seat base for attaching the seat to an aircraft deck, a seat frame mounted on the seat base, and a seat pan and seat back mounted on the seat frame. At least one armrest is mounted on the seat frame and includes a cup holder for passenger use. An elongate armrest can of the armrest is adapted to be carried by the seat and an elongate storage area formed in the armrest can. The cup holder is mounted for movement along a longitudinal axis of the armrest between a stowed position within the storage area of the armrest can and a deployed position forward of and to the exterior of the armrest.

Embodiments of the inventive concepts can include one or more or any combination of the above aspects, features and configurations.

BRIEF DESCRIPTION OF THE DRAWINGS

Implementations of the disclosed inventive concepts are better understood when consideration is given to the following detailed description. The description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function in the drawings.

DETAILED DESCRIPTION OF EXEMPLARY EMBODIMENTS

The inventive concepts are described with reference to the accompanying drawings in which exemplary embodiments are shown. However, the inventive concepts may be embodied in many different forms and should not be construed as limited to the representative embodiments of this application.

Figure 1:
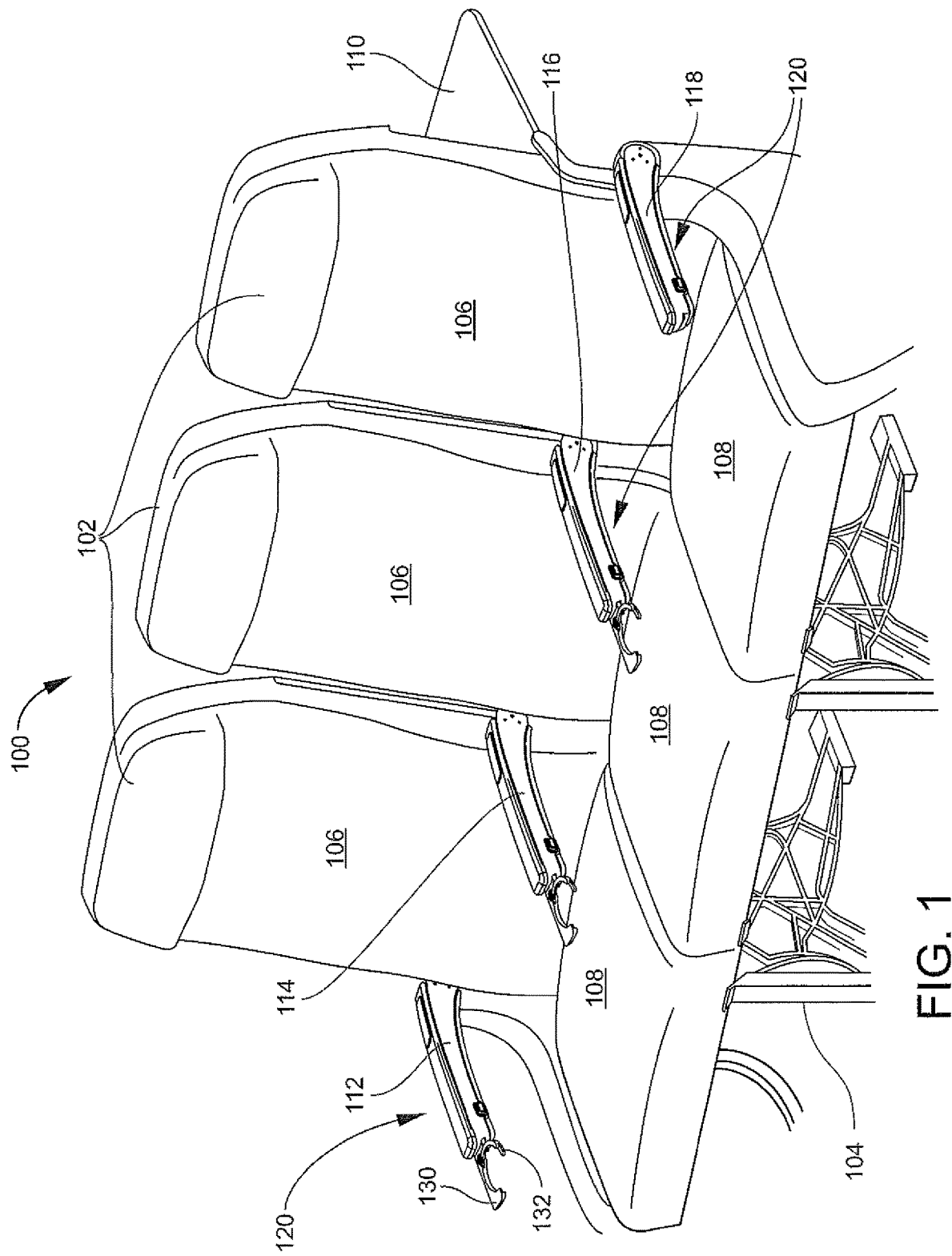
FIG. 1 is a perspective view of a three seat array of aircraft passenger seats, including armrests each having a cup holder in accordance with one exemplary embodiment of the invention.

In an exemplary embodiment, FIG. 1 shows a grouping 100 of aircraft passenger seats 102 positioned on a base 104 and each of which include a seat back 106, a seat bottom 108, and a drop down tray table 110 (shown in its deployed position) that is stowed when not in use against an aft-facing side of the seat back 106. The seat grouping 100 includes four armrests 112, 114, 116 and 118 shared by seat occupants of the three seats 102. Three of the armrests 112, 114, and 116 are provided with a cup holder 120. The remaining description is directed to the cup holder 120 and the armrest 114 as exemplary of armrests and seats that may be utilized in a passenger aircraft. The cup holder 120 also has application in armrests for use in other types of seating, such as seats employed in other types of vehicles, offices and residences.

Figure 2:
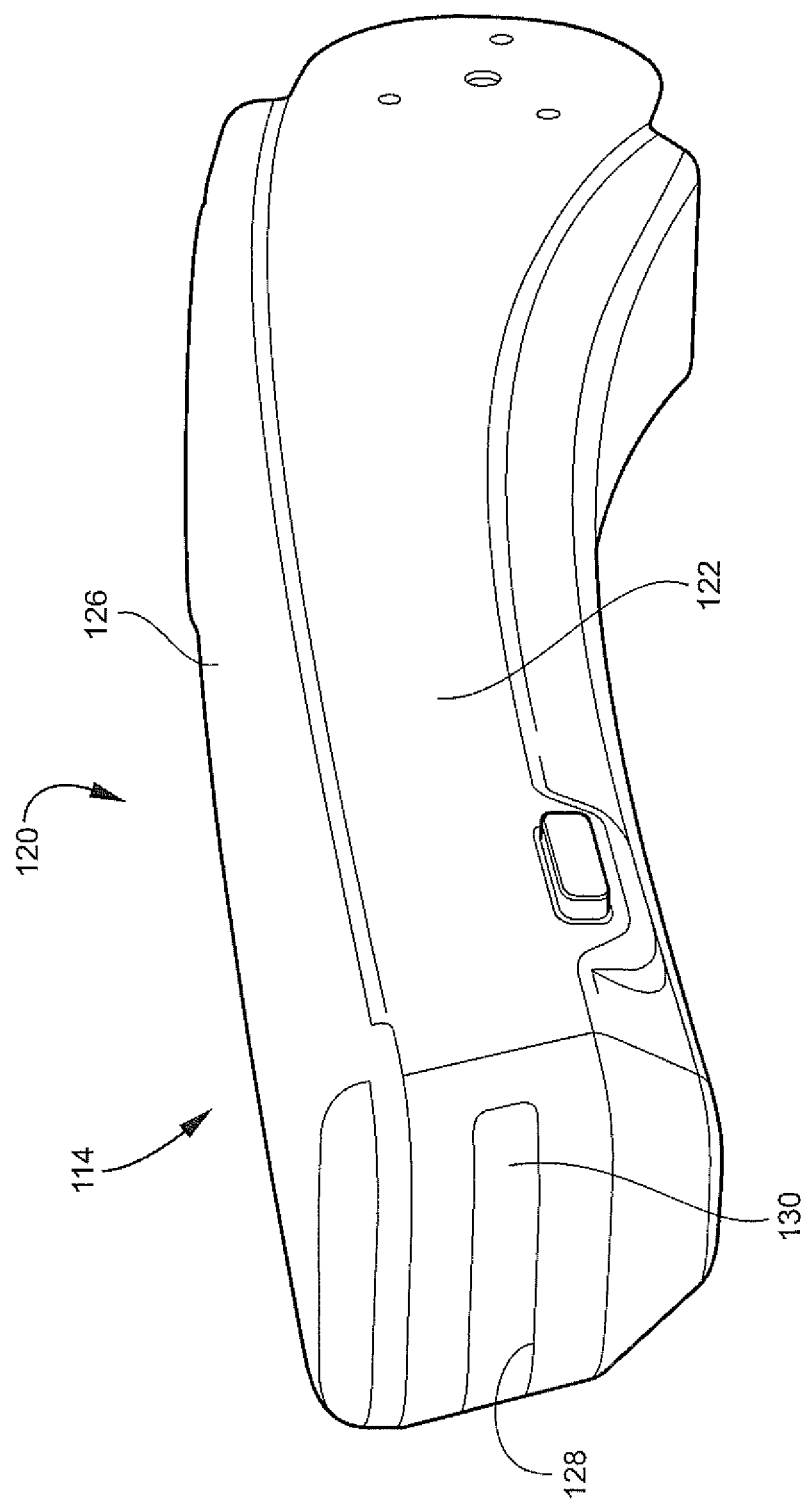
FIG. 2 is a perspective view of an armrest with the cup holder in a stowed position according to an exemplary embodiment of the invention.
Figure 5:
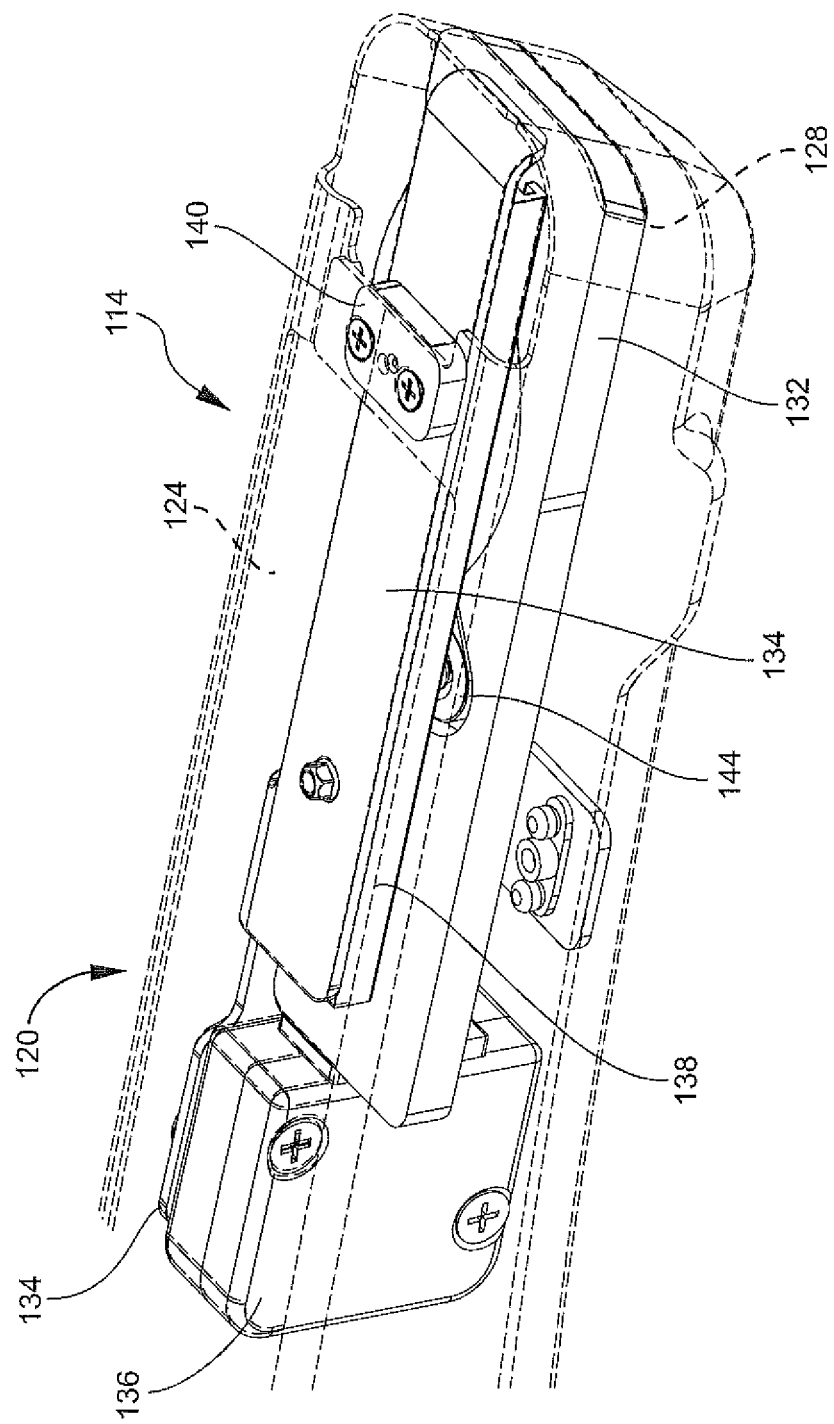
FIG. 5 is a perspective view of the cup holder in the stowed position with armrest parts broken away for clarity.

Referring now to FIG. 2, armrest 114 includes an armrest can 122 that includes an internal elongate storage area 124, see, e.g., FIG. 5, and a padded cover 126. The armrest 114 includes an access opening 128 on the forward end of the armrest can 122, as described in further detail below. In an exemplary embodiment, the cover 126 may be removed to gain access to the storage area 124.

Figure 3:
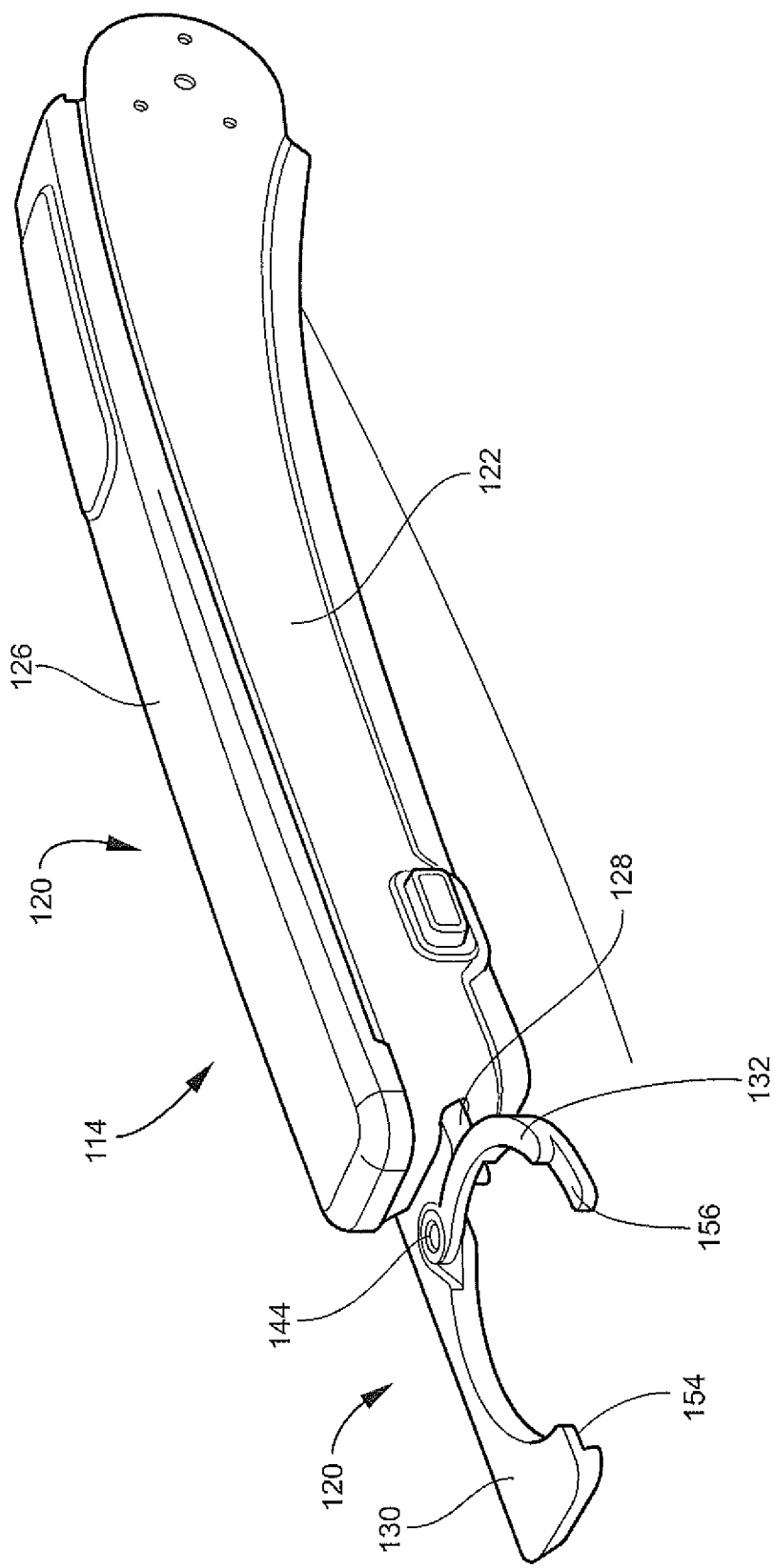
FIG. 3 is a perspective view of an armrest with the cup holder in a fully deployed position according to an exemplary embodiment of the invention.

In FIG. 3 the cup holder 120 is shown in the deployed position extending outwardly and forwardly from the access opening 128. Visible in FIG. 3 are a stationary arm 130 and a pivot arm 132. The pivot arm 132 is mounted to the stationary arm 130 and is spring-loaded with a bias away from the stationary arm 130. By comparing FIGS. 2 and 3 it will be noted that the forward edge of the stationary arm 130 resides in a flush condition in the access opening 128 when stowed.

Figure 4:
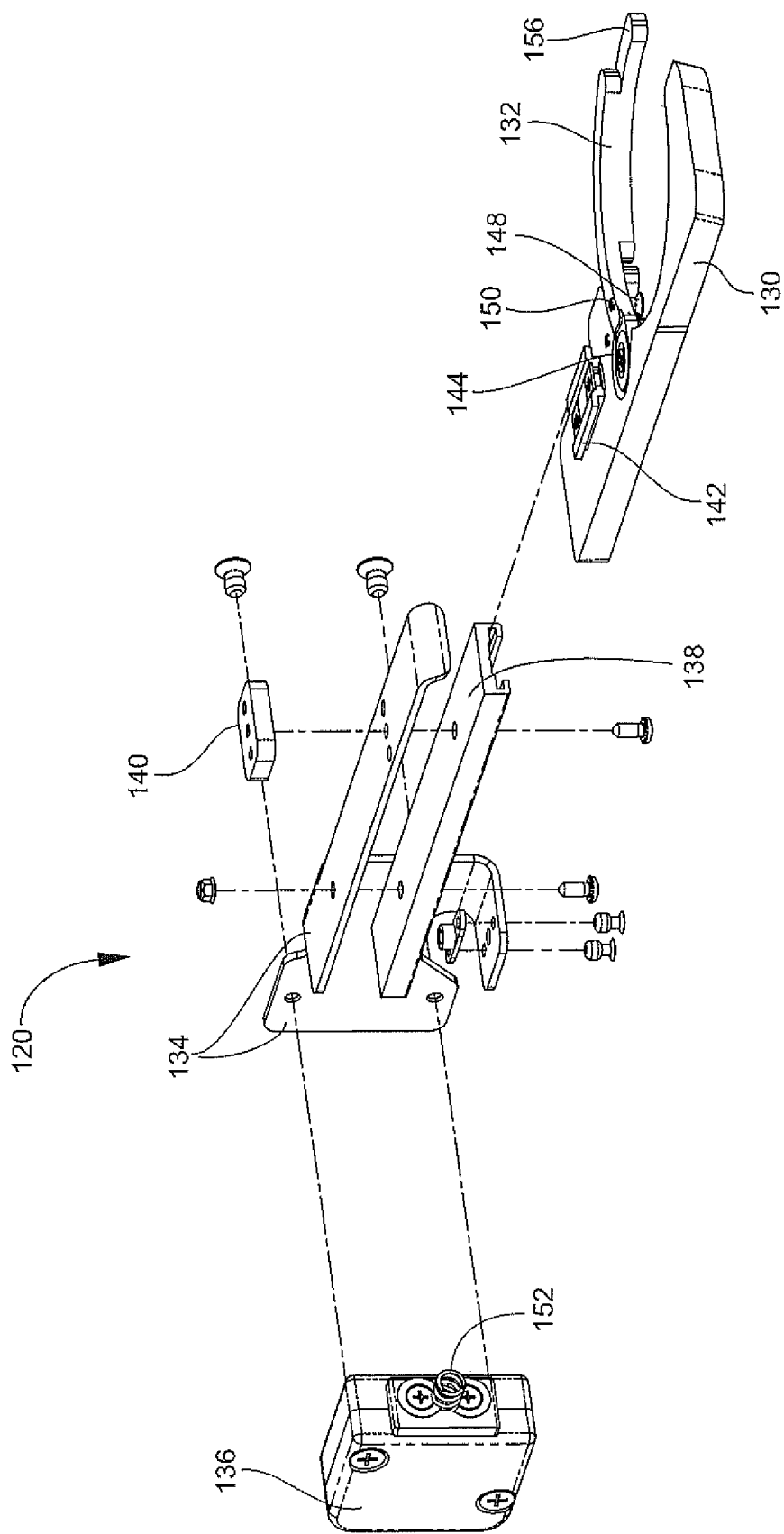
FIG. 4 is an exploded view of the cup holder according to an exemplary embodiment of the invention.

Referring to FIG. 4, the principal components of the cup holder 120 are identified and shown in an exploded condition for clarity. The cup holder 120 includes a bracket 134 onto which is mounted a magnetic latch assembly 136 and a rail 138. A spacer 140 is mounted to the top of the bracket 134. A carriage 142 is mounted to the top of the stationary arm 130 and is received for sliding movement in the rail 138. The pivot arm 132 is mounted to the stationary arm 130 by a machine screw 144 that captures a washer 146. A helical extension spring 148 is connected between the machine screw 144 and a pin 150 in pivot arm 132. The spring 148 biases the pivot arm 132 away from the stationary arm 130.

Figure 6:
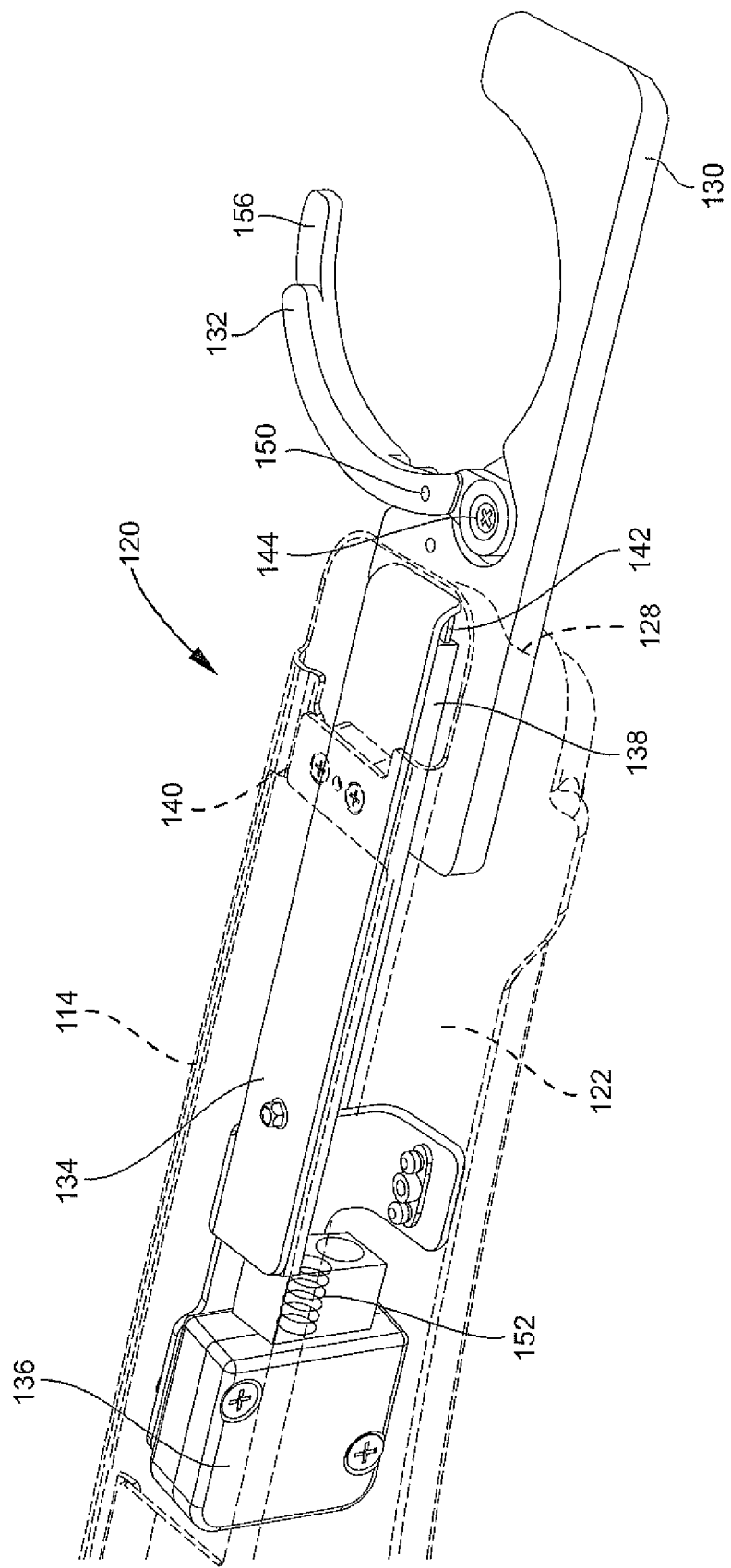
FIG. 6 is a perspective view of the cup holder in the deployed position with armrest parts broken away for clarity.

In a stowed position, FIG. 2, the cup holder 120 is contained within the armrest can 122. To release the cup holder 120, a finger is used to depress the forward edge of the stationary arm 130 visible in the access opening 128. The stationary arm 130 and the attached pivot arm 132 are released and are deployed outwardly a sufficient distance to be grasped and pulled into the fully deployed position shown in FIG. 3. The pivot arm 132 pivots away from the stationary arm 130 into the position of FIG. 6 and is in a position to receive a cup or other suitably-sized beverage container. To stow the deployed cup holder 120, a finger is used to push the stationary arm 130 rearward through the access opening 128 and into the armrest can 122. When fully stowed the cup holder 120 resumes the position shown in FIG. 2.

Operation of the cup holder 120 during deployment and stowage is shown and explained in further detail in the sequential views in FIGS. 7-21.

Figure 7:
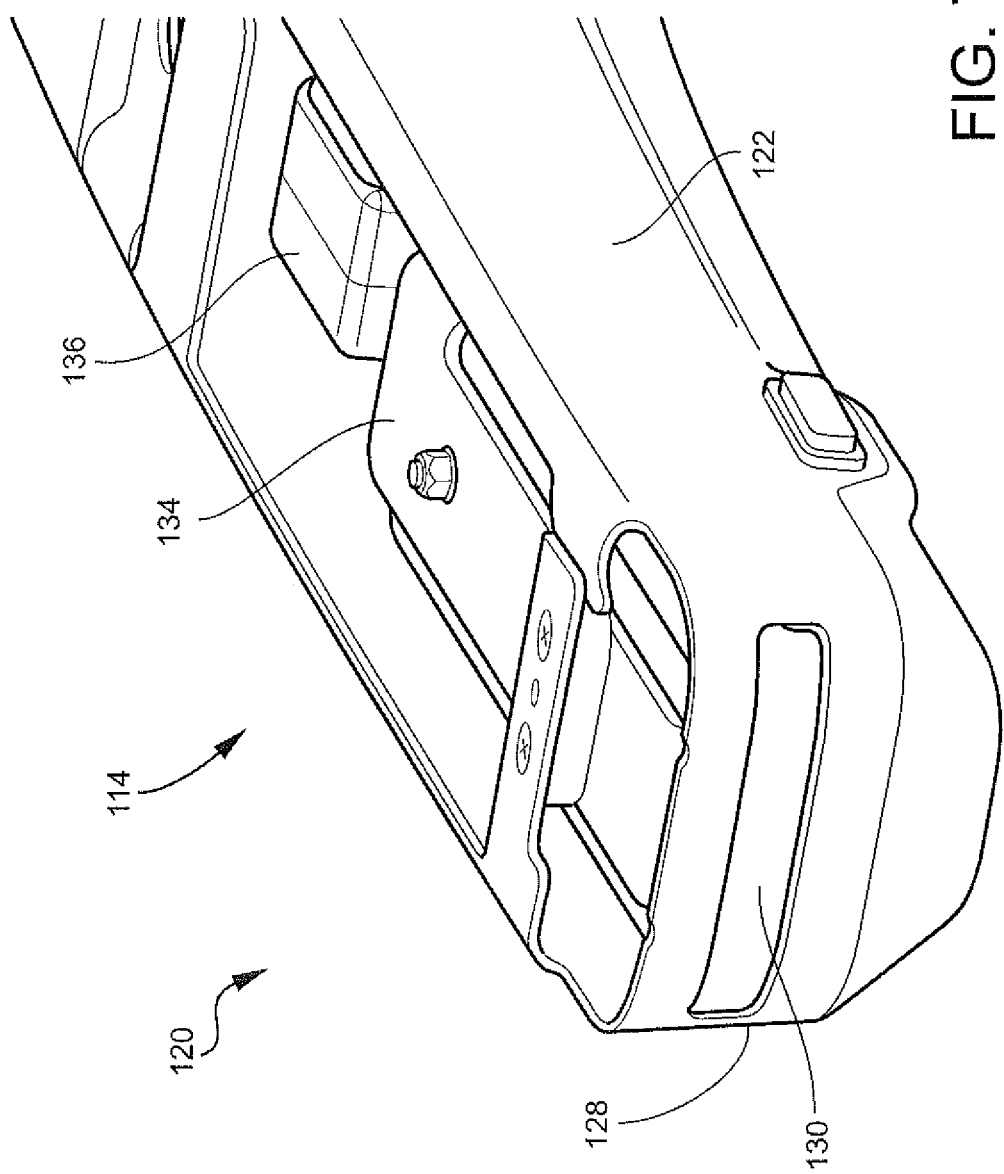
FIG. 7 is a perspective view of the cup holder in a fully stowed position with armrest parts broken away for clarity.
Figure 8:
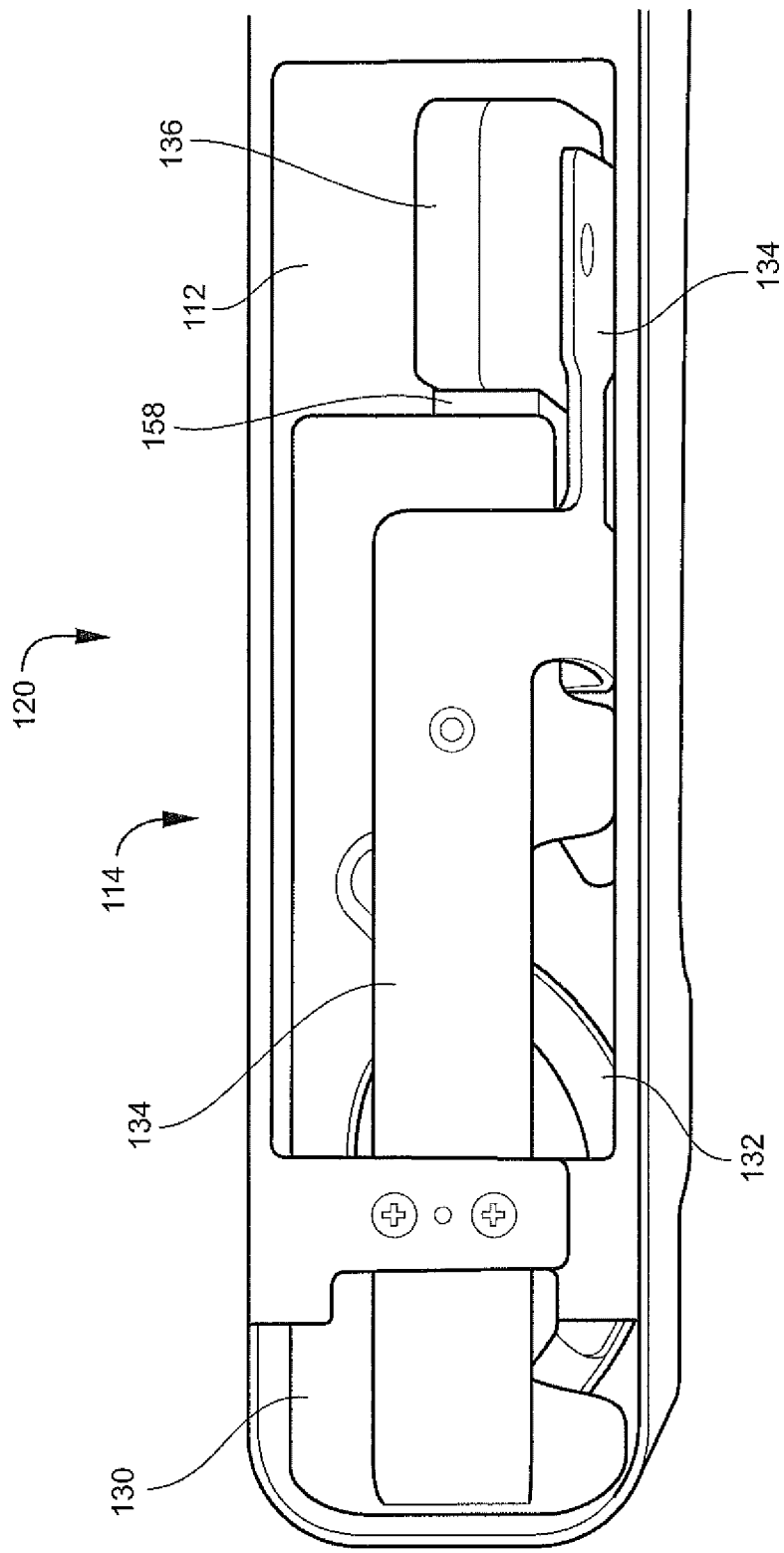
FIG. 8 is a top plan view of the cup holder in a fully stowed position with armrest parts broken away for clarity.
Figure 9:
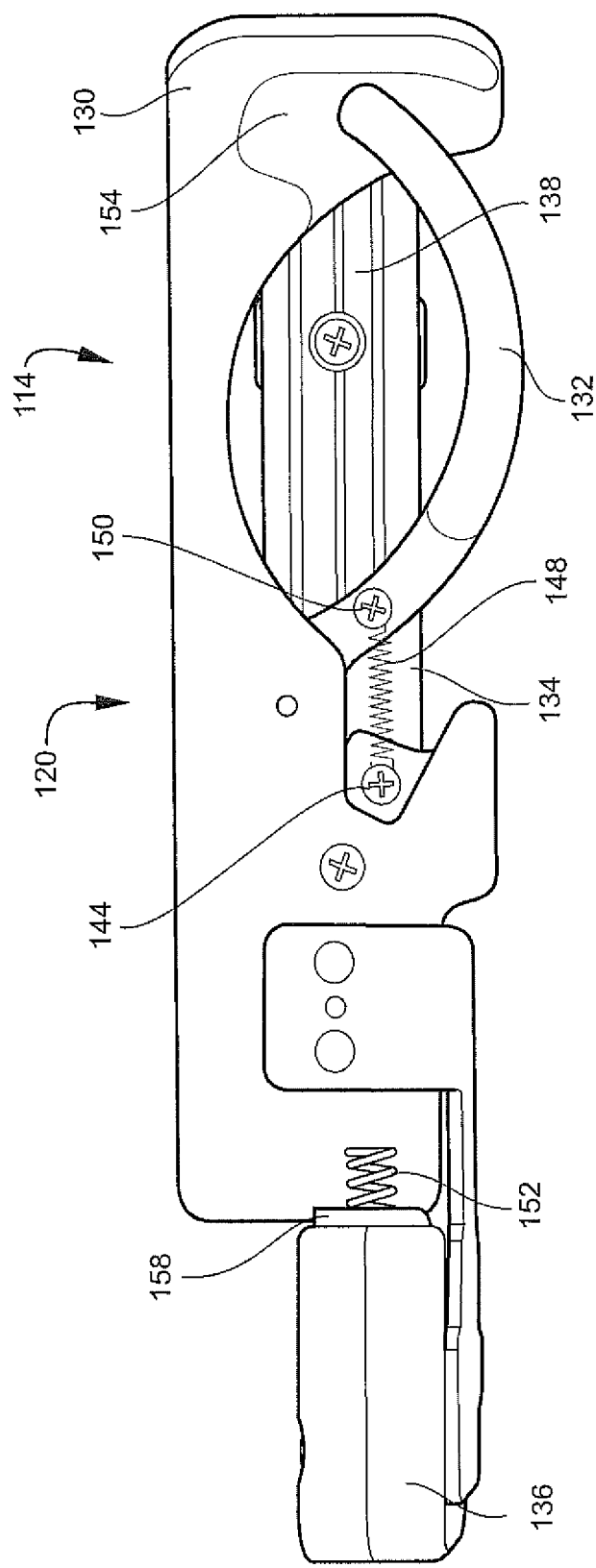
FIG. 9 is a bottom plan view of the cup holder in a fully stowed position.

FIGS. 7, 8 and 9 show the cup holder 120 in a fully stowed position in top perspective, top plan and bottom plan views. The magnetic latch assembly 136 exerts sufficient magnetic attraction against the innermost end of the stationary arm 130 to retain the stationary arm 130 in the shown position.

Figure 10:
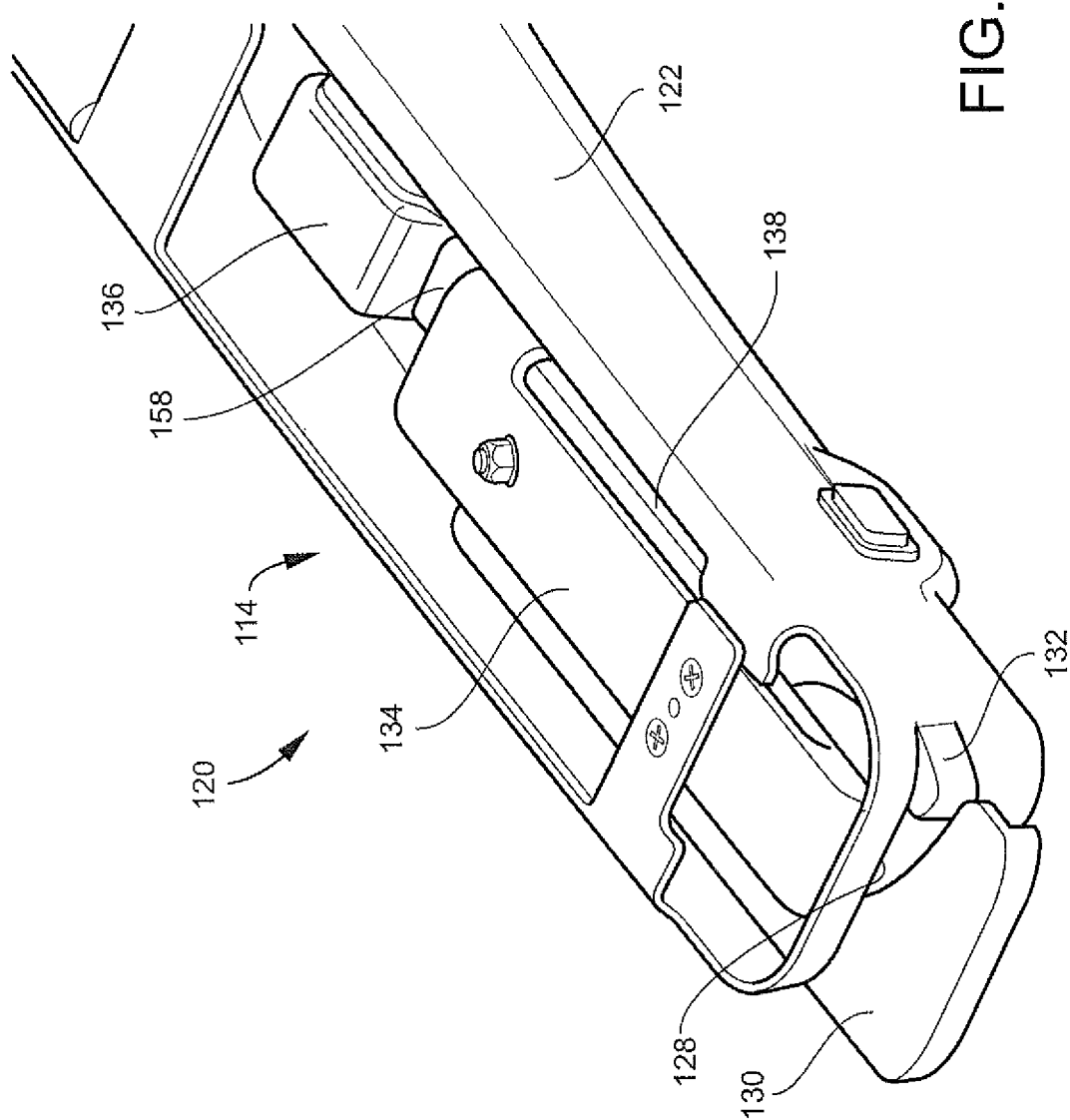
FIG. 10 is a perspective view of the cup holder in a first position during deployment with armrest parts broken away for clarity.
Figure 11:
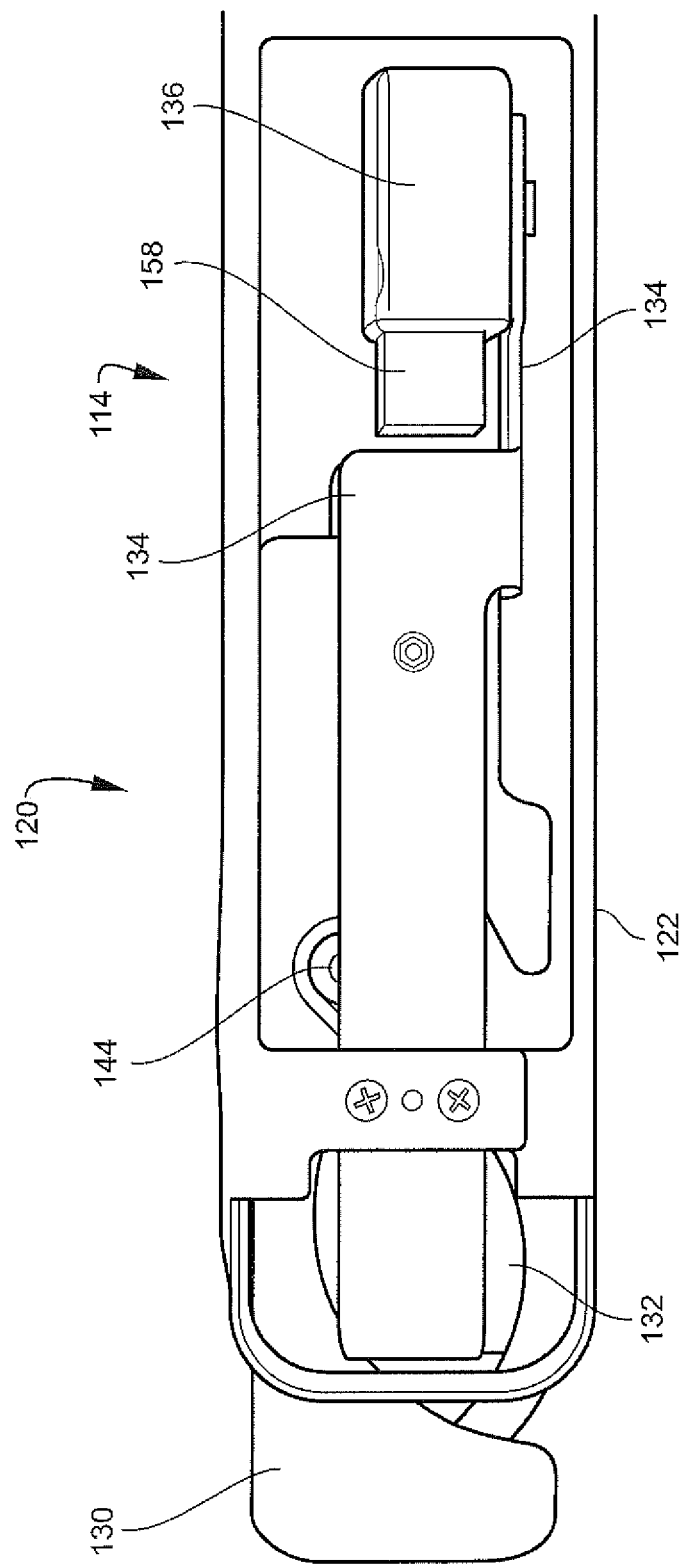
FIG. 11 is a top plan view of the cup holder in a first position during deployment with armrest parts broken away for clarity.
Figure 12:
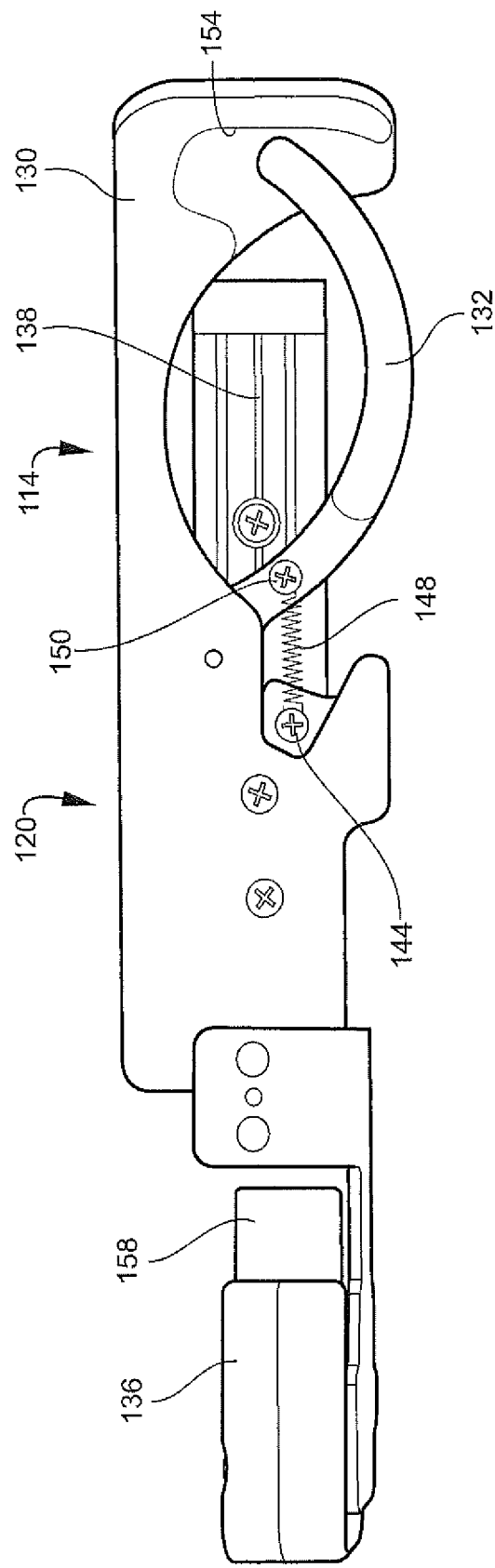
FIG. 12 is a bottom plan view of the cup holder in a first position during deployment.

Referring to FIGS. 10, 11 and 12, a spring 152, see FIG. 4, is positioned inside of the magnetic latch assembly 136. When the magnetic latch assembly 136 is in a minimal position, the rearward end of the stationary arm 130 aligns with the end of the armrest can 122. The magnetic latch assembly 136 exerts sufficient magnetic attraction against the innermost end of the stationary arm 130 to retain the stationary arm 130 in the shown position against the opposite bias of a spring 152. By pressing the stationary arm 130 inwardly, a magnet housing 158 and the magnetic latch spring 152 depresses slightly then bottoms out, and pushes the stationary arm 130 forward to the deployed position. Once the stationary arm 130 is no longer flush with the armrest can 122, it can be gripped by the user more easily, and the user then pulls the cup holder 120 outwardly away from the magnetic latch assembly 136 along the rail 139 into to its fully deployed position.

Figure 13:
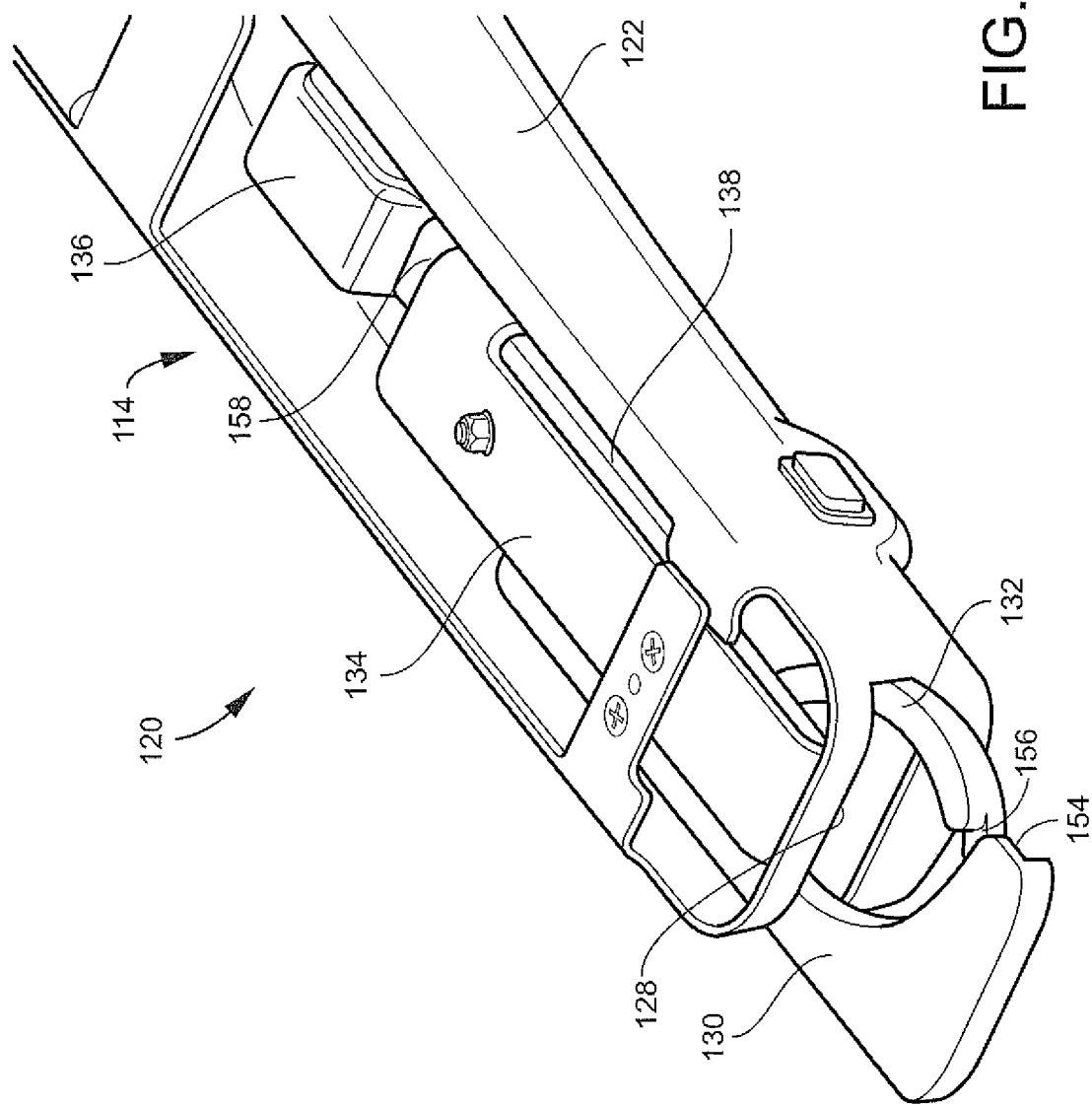
FIG. 13 is a perspective view of the cup holder in a second position during deployment with armrest parts broken away for clarity.
Figure 14:
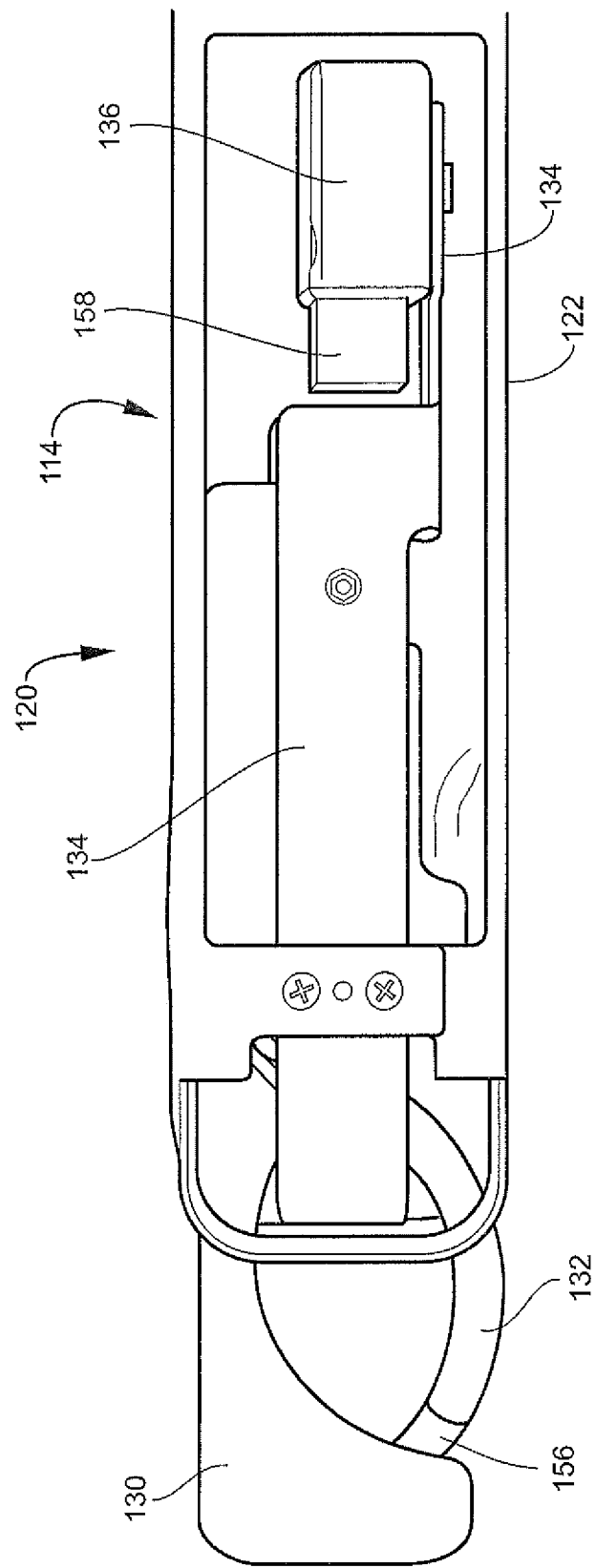
FIG. 14 is a top plan view of the cup holder in a second position during deployment with armrest parts broken away for clarity.
Figure 15:
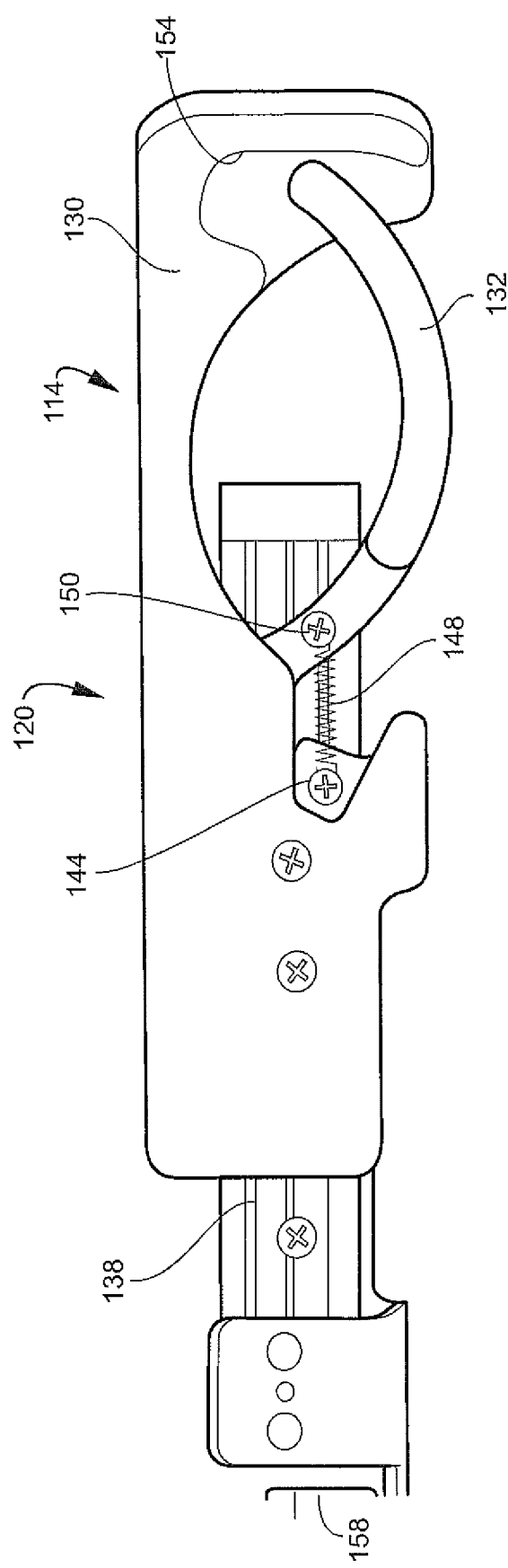
FIG. 15 is a bottom plan view of the cup holder in a second position during deployment.

In FIGS. 13, 14 and 15, approximately one half of the cup-holding portion of the stationary arm 130 and pivot arm 132 have deployed. As best shown in FIGS. 13 and 14, when the pivot arm 132 has moved to the shown position, the extension spring 148 pushes the pivot arm 132 away from the stationary arm 130.

Figure 16:
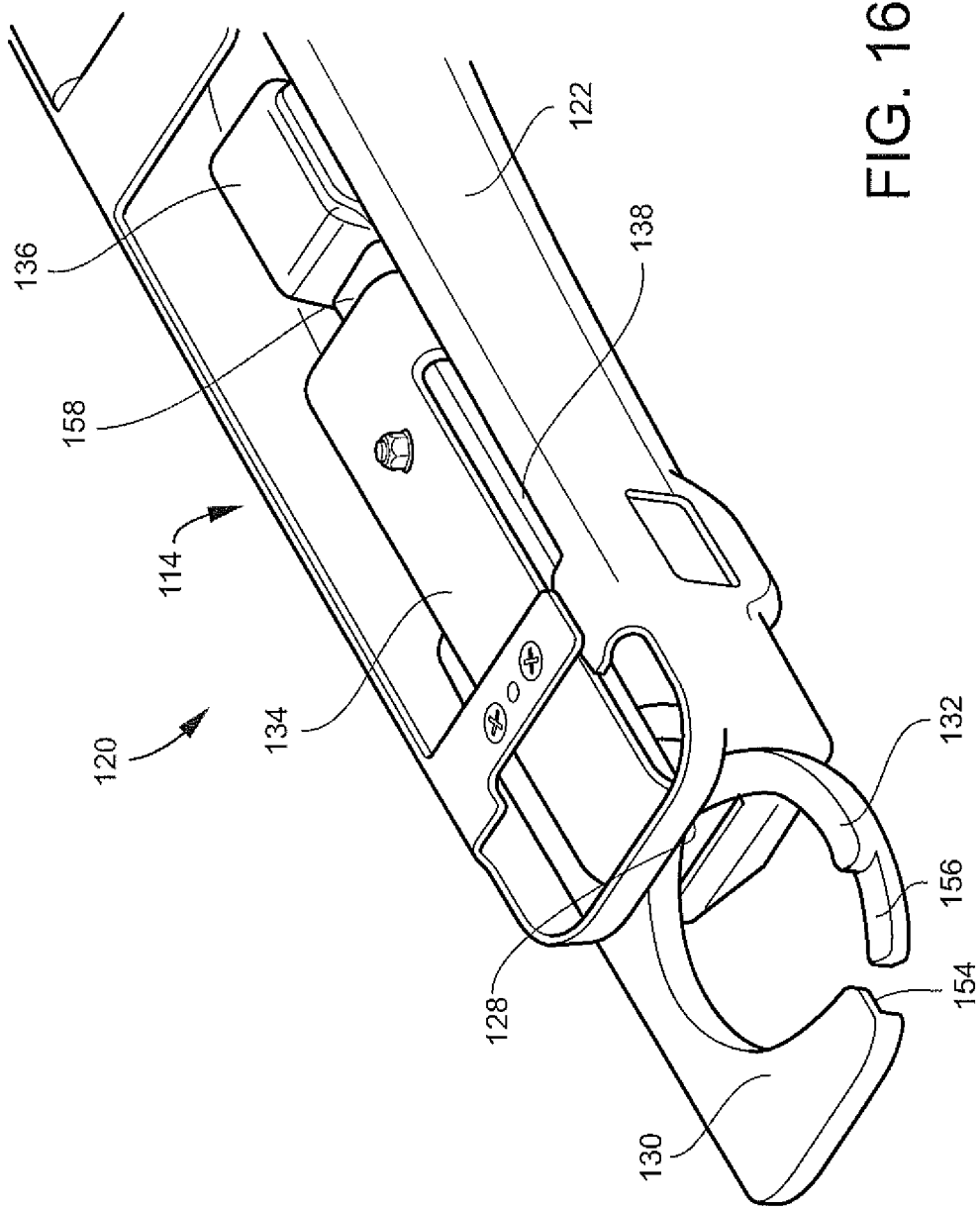
FIG. 16 is a perspective view of the cup holder in a third position during deployment with armrest parts broken away for clarity.
Figure 17:
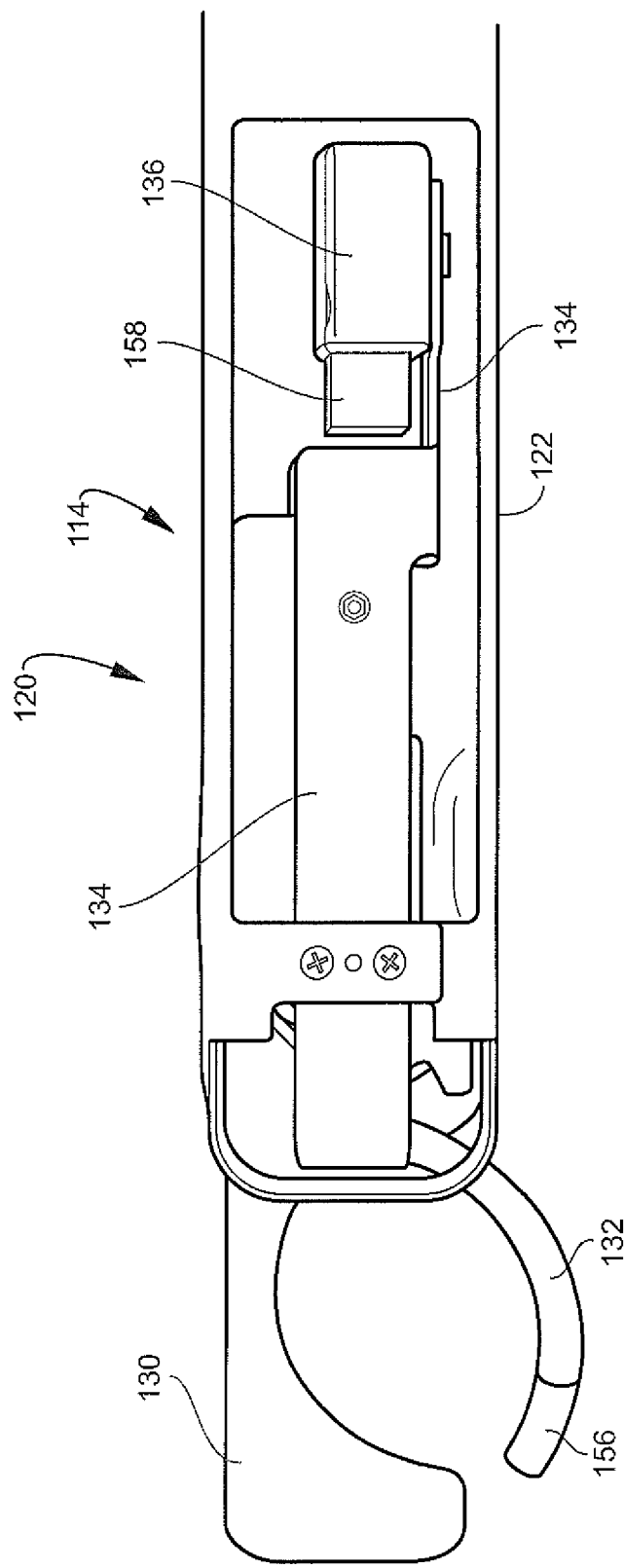
FIG. 17 is a top plan view of the cup holder in a third position during deployment with armrest parts broken away for clarity.
Figure 18:
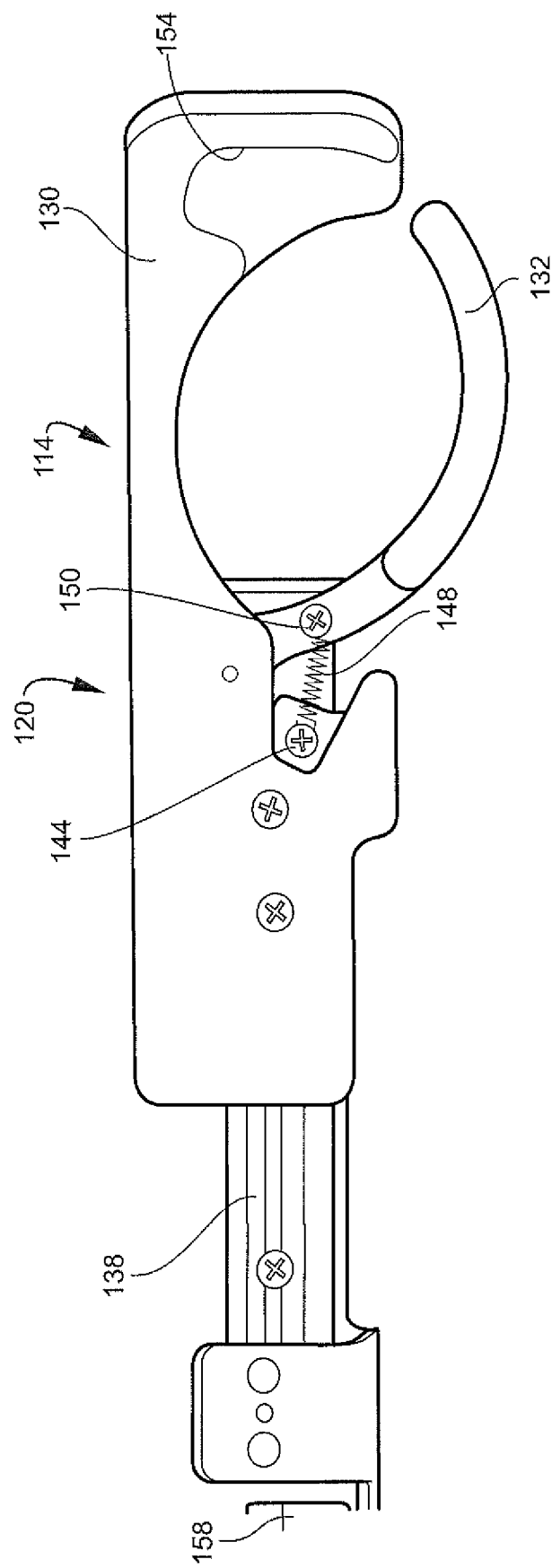
FIG. 18 is a bottom plan view of the cup holder in a fourth position during deployment.

In FIGS. 16, 17 and 18 the cup holder 120 is almost completely deployed. The pivot arm 132 has exited the access opening 128 and is widening into the fully open position.

Figure 19:
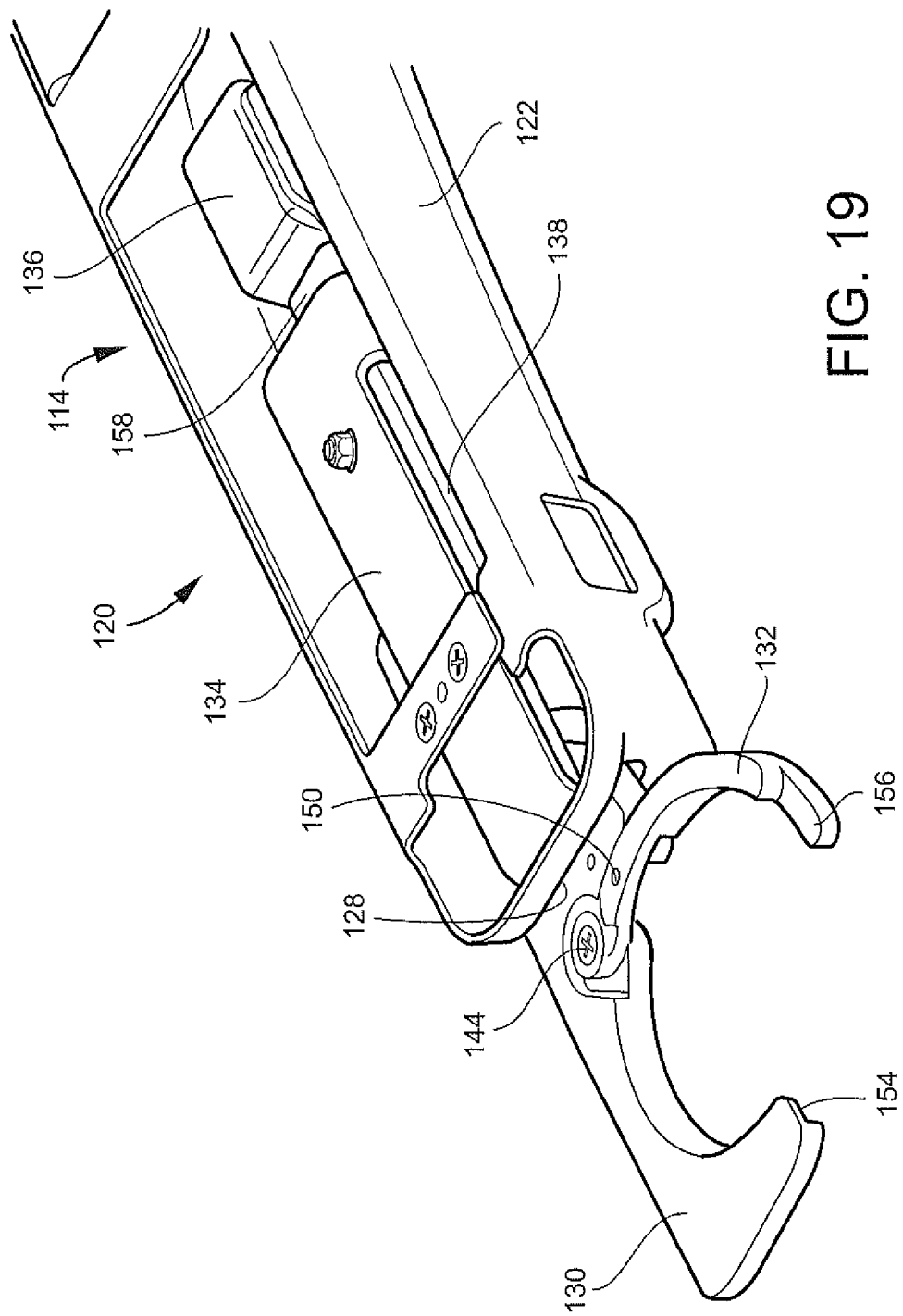
FIG. 19 is a perspective view of the cup holder in a fully deployed position with armrest parts broken away for clarity.
Figure 20:
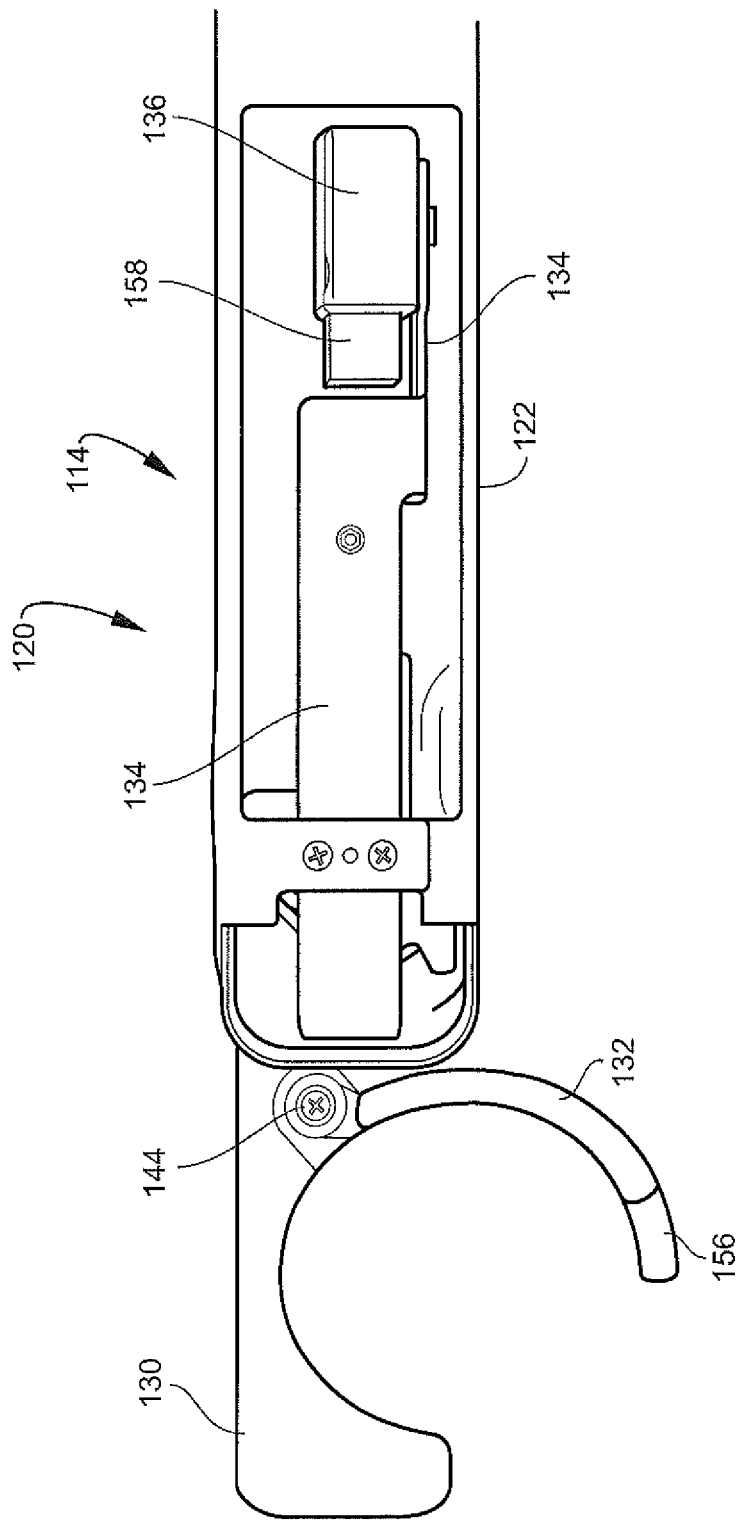
FIG. 20 is a top plan view of the cup holder in a fully deployed position with armrest parts broken away for clarity.
Figure 21:
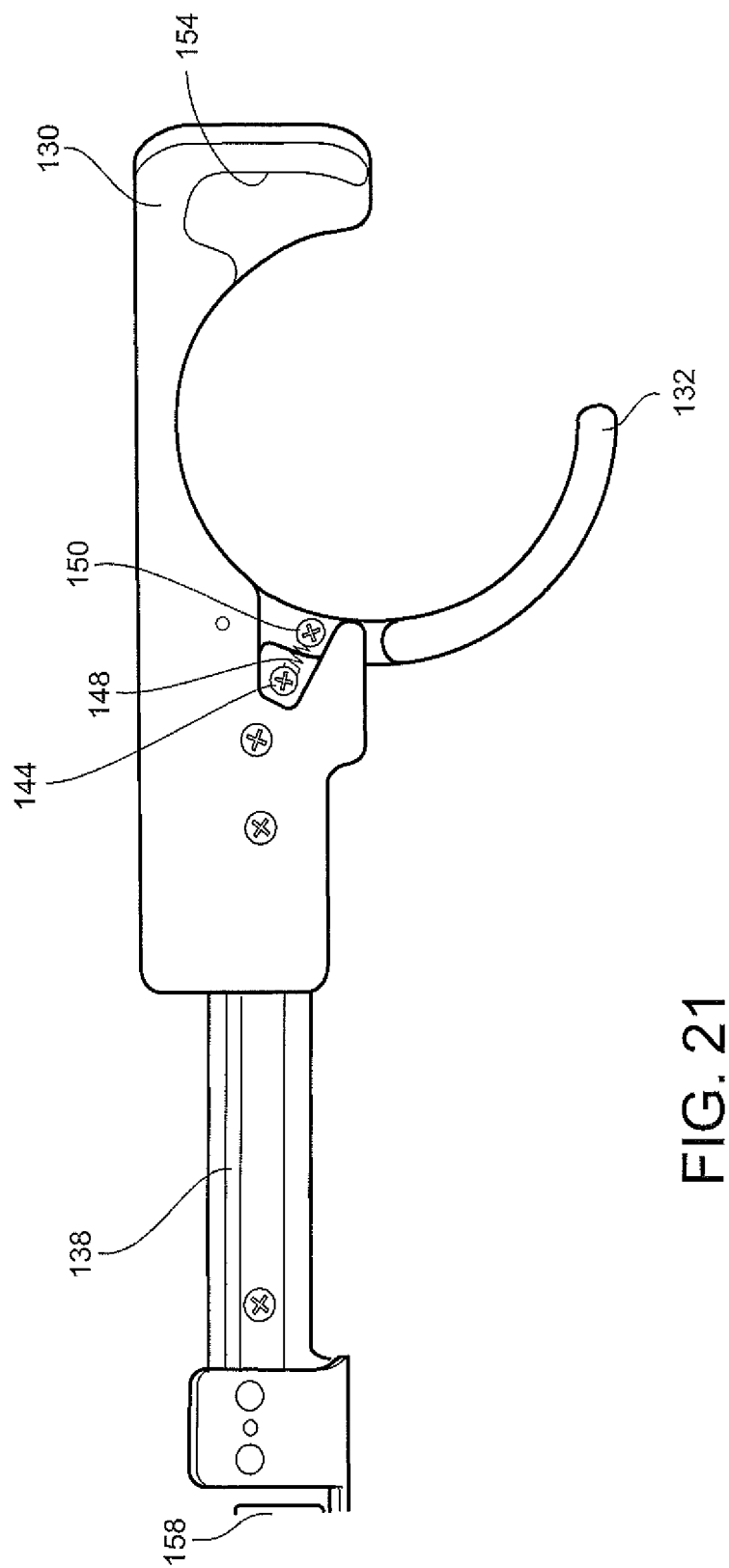
FIG. 21 is a bottom plan view of the cup holder in a fully deployed position.

The fully deployed use position is shown in FIGS. 19-21. Note particularly that the stationary arm 130 and pivot arm 132 are designed to reside in the same horizontal plane both when stowed and deployed. This substantially reduces the necessary thickness of the cup holder 120 and is accomplished by providing an undercut area 154 in the stationary arm 130 and an area of reduced thickness 156 in the pivot arm 132. See FIG. 3. The area of reduced thickness 156 of the pivot arm 132 nests into the undercut area 154 when in the stowed and partially-stowed positions. See FIG. 3, and compare the position of the pivot arm 132 in the undercut area 154 of the stationary arm 130 in FIGS. 9, 12, 15, 18 and 21.

In an exemplary embodiment, the access opening is 1.5 in. (3.8 cm) wide and 0.3 in. (0.76 cm) deep. Maximum width of the cup holder 120 when deployed is 3 in (7.6 cm). Maximum inside diameter between the stationary arm 130 and the pivot arm 132 when deployed is 2.5 in. (6.3 cm). Other inside diameters are possible keeping the same width of the cup holder 120.

The diameter of cups that can be held in the cup holder 120 is based on the cone shape of the cup. As long a cup's bottom diameter is smaller than 2.5 in. (6.3 cm) and the top is larger than 2.5 in. (6.3 cm) the cup will fit in the cup holder 120. For best stability, the cup should have a diameter of 2.5 in. (6.3 cm) around the top ⅔'s of the cup.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

We claim:

1. An armrest assembly, comprising:
   an elongate armrest can adapted to mount to a seat, the elongate armrest can having an open top and an elongate slot formed in a forward end;
   an elongate storage area formed within the elongate armrest can accessible through the open top;
   a padded cover removably attached to the elongate armrest can closing the open top,
   a cup holder assembly disposed within the elongate storage area, the cup holder assembly comprising a deployable cup holder mounted for movement along a longitudinal axis of the elongate armrest can between a stowed position within the elongate storage area and a deployed position through the elongate slot and forward of the forward end, the cup holder assembly including a bracket carrying a rail disposed within the elongate storage area and the rail slidably receiving a carriage mounted to a first arm of the deployable cup holder, and
   a latch assembly mounted to the bracket at one end of the rail opposite the elongate slot, the latch assembly including a spring engaging the carriage to bias the deployable cup holder toward the deployed position and a magnet magnetically attracted to the carriage to retain the cup holder against the opposite bias of the spring.

2. The armrest assembly according to claim 1, wherein the deployable cup holder includes the first arm fixed in orientation to the longitudinal axis of the elongate armrest can and a second arm mounted for pivoting lateral movement relative to the first arm to form a space between the first and second arms within which a cup is adapted to be held when the cup holder is in the deployed position.

3. The armrest assembly according to claim 2, wherein portions of each of the first and second arms include an arcuate segment.

4. The armrest assembly according to claim 2, wherein the second arm is mounted on the first arm for pivoting movement relative to the first arm, and includes a spring connecting the first arm and the second arm for pivoting the second arm laterally away from the first arm to define the space between the first and second arms.

5. The armrest assembly according to claim 1, wherein the latch assembly includes a push-to-release switch for releasing the deployable cup holder from the stowed position when the push-to-release switch is actuated.

6. The armrest according to claim 5, wherein the push-to-release switch is actuated by pushing a forward edge of the first arm inwardly from a position flush with the forward end of the elongate armrest can.

7. An armrest assembly for a vehicle seat, comprising
   an elongate armrest can having sidewalls, a bottom, an open top, a forward end, and an elongate horizontal slot formed in the forward end;
   a padded cover removably attached to a top of the elongate armrest can;

an elongate storage area formed within the elongate armrest can and open to the open top and the elongate horizontal slot;

a cup holder assembly including a cup holder mounted for movement along a longitudinal axis of the elongate armrest can between a stowed position within the elongate storage area and a deployed position through the elongate horizontal slot and forward of the forward end, the cup holder including a stationary arm fixed in orientation to the longitudinal axis of the elongate armrest can and a pivot arm mounted for lateral movement relative to the stationary arm;

a bracket disposed in the elongate storage are mounted to one of the sidewalls;

a rail attached to the bracket;

a carriage slidable along the rail to move the cup holder assembly between the stowed position and the deployed position; and a latch assembly attached to bracket at one end of the rail opposite the elongate slot, the latch assembly including a spring engaging the carriage to bias the cup holder toward the deployed position and a magnet magnetically attracted to the carriage to retain the cup holder against the opposite bias of the spring.

8. The armrest assembly according to claim 7, wherein each of the stationary arm and the pivot arm include an arcuate portion.

9. The armrest assembly according to claim 7, wherein the latch assembly includes a push-to-release switch actuated by pushing a forward edge of the stationary arm inwardly from a position flush with a forward surface of the elongate armrest can.

10. The armrest assembly according to claim 7, wherein the pivot arm is mounted on the stationary arm for pivoting movement relative to the stationary arm, and includes a spring biasing the pivot arm in a direction away from the stationary arm.

\* \* \* \* \*